US006619209B2

(12) United States Patent
Dreher et al.

(10) Patent No.: US 6,619,209 B2
(45) Date of Patent: Sep. 16, 2003

(54) PROCESS AND PRINTING MACHINE FOR DETERMINING REGISTRATION ERRORS

(75) Inventors: Ingo Klaus Michael Dreher, Kiel (DE); Heiko Hunold, Wattenbek (DE); Patrick Metzler, St. Wendel (DE); Stefan Schrader, Kiel (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 10/208,626

(22) Filed: Jul. 30, 2002

(65) Prior Publication Data

US 2003/0037690 A1 Feb. 27, 2003

(30) Foreign Application Priority Data

Aug. 22, 2001 (DE) ........................................ 101 41 034

(51) Int. Cl.[7] ............................ B41F 1/34; G06F 15/00; G01D 15/06

(52) U.S. Cl. ........................ 101/485; 347/116; 700/124

(58) Field of Search ................................ 101/481, 484, 101/485; 399/301; 382/287, 151, 317; 700/124; 226/1, 2, 27; 271/3.14, 3.15, 3.17, 4.02, 4.03, 4.05, 4.06, 4.1, 4.12, 7, 8.1, 9.02, 9.04, 9.05, 12, 10.02, 10.03, 10.07, 10.15, 34, 258.01, 259–261, 264, 265.01, 265.02, 153, 198; 400/6, 280, 281, 578, 579, 580; 347/116

(56) References Cited

U.S. PATENT DOCUMENTS

| | | | | | |
|---|---|---|---|---|---|
| 3,915,090 | A | * | 10/1975 | Horst et al. | 101/181 |
| 4,553,478 | A | * | 11/1985 | Greiner et al. | 101/484 |
| 5,384,592 | A | * | 1/1995 | Wong | 347/116 |
| 5,802,974 | A | * | 9/1998 | McNeil | 101/226 |
| 2002/0177918 | A1 | * | 11/2002 | Pierel et al. | 700/124 |
| 2002/0178952 | A1 | * | 12/2002 | Sainio et al. | 101/485 |

FOREIGN PATENT DOCUMENTS

| | | | |
|---|---|---|---|
| DE | 198 06 551 | C2 | 9/1988 |
| DE | 37 20396 | A1 | 1/1989 |
| EP | 1157 837 | A2 | 11/2001 |
| JP | 2000272089 | A | 10/2000 |

* cited by examiner

*Primary Examiner*—Andrew H. Hirshfeld
*Assistant Examiner*—Hoai-An D. Nguyen
(74) *Attorney, Agent, or Firm*—Lawrence P. Kessler

(57) ABSTRACT

A process and printing machine for determining registration errors and correcting therefore. At least one first registration mark is applied onto a conveyor belt for transporting a sheet, and at least one second registration mark is applied onto the sheet adjacent to the first registration mark. The first registration mark and the second registration mark are detected, the distance between the first registration mark and the second registration mark is calculated, and the difference between the calculated distance and a distance without different speeds of the conveyor belt and the sheet (a target value) is calculated.

5 Claims, 2 Drawing Sheets

PROCESS AND PRINTING MACHINE FOR DETERMINING REGISTRATION ERRORS

FIELD OF THE INVENTION

The invention involves a process and a printing machine for determining registration errors caused by different speeds of a sheet conveyor belt and a sheet moved on such conveyor belt.

BACKGROUND OF THE INVENTION

In the printing of sheets of paper or the like by printing machines, the correctly positioned printing of the printed image on the sheet is of considerable importance. This characteristic is identified by the term registration. In order to set the registration, in addition to the printed image, registration marks are used, by which deviations from correctly positioned print are determined and measured by the operator of the printing machine. In a further embodiment of this process, the registration is determined and calculated using sensors in the printing machine. To do this, the sensors detect the registration marks on the conveyor belt or the sheet and determine, using the position of the registration marks, whether the printing is being done without errors.

The process and devices of the state of the art detect and correct errors that occur due to mechanical shifts of the sheet on the conveyor belt or shifts of the conveyor belt. Furthermore, errors occur which are caused by the speed of the conveyor belt differing from the speed of the sheet on the conveyor belt. This effect comes from the fact that the conveyor belt does not run straight at all positions, especially in the print modules, but runs in a curved line due to the rollers pressing onto the conveyor belt. The speed on the surface of the sheet is higher than the speed on the surface of the conveyor belt. As a result, the surface of the sheet covers a longer distance over time on the curved positions than the surface of the conveyor belt.

The distances covered, however, according to which the image is applied to the sheet, are defined by a specific time that passes during the movement of the conveyor belt between a sensor signal and a print module. As a result, a shifted application of the printed image occurs in the print modules, in which the sheet that lies on the conveyor covers a longer distance over time because of the non-straight progression of the conveyor belt and changing sheet thicknesses.

SUMMARY OF THE INVENTION

The purpose of the invention is thus to determine the registration errors described above, and correcting for the errors that are determined. The invention is achieved by a process and by a printing machine wherein there is an application of at least a first registration mark onto the conveyor belt and at least a second registration mark onto the sheet, a detection of the first registration mark and the second registration mark, a calculation of the distance between the first registration mark and the second registration mark and a comparison of the distance to a target value to determine a registration error correction value.

The invention, and its objects and advantages, will become more apparent in the detailed description of the preferred embodiment presented below.

BRIEF DESCRIPTION OF THE DRAWINGS

In the following, the invention is described in detail with reference to the drawings in which.

DETAILED DESCRIPTION OF THE INVENTION

Figure 1:
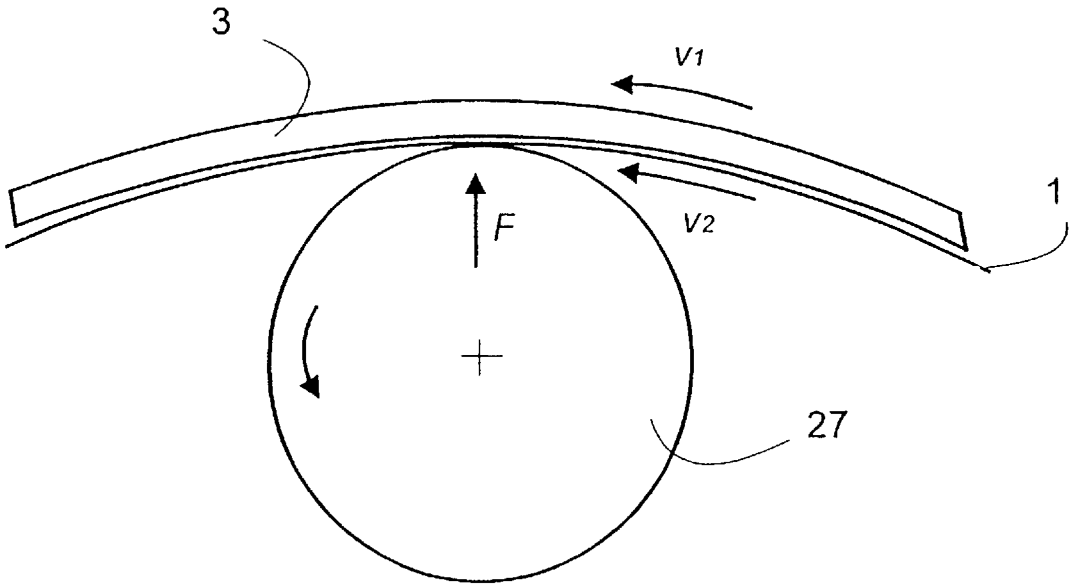
FIG. 1 shows a press roller under a conveyor belt in order to illustrate the cause of the registration error in relation to the invention.

FIG. 1 shows a schematic view of a press roller 27 of a printing machine, which exerts a force F from below onto a conveyor belt 1 of the printing machine. The press roller 27 is set in bearings and can exert a changing force F onto the conveyor belt 1. The conveyor belt 1 moves at a certain speed in the direction of the arrow and moves the press roller 27 due to friction. The conveyor belt 1 is depicted in FIG. 1 in an ideal manner almost without spatial thickness expansion, the speed on the upper side of the conveyor belt 1 is actually higher than the underside, whereby the speed difference increases with the thickness of the conveyor belt 1.

This effect can be explained by the curve of the progression of the conveyor belt 1 along the press roller 27. As can be easily understood, the speed of a point is greater, the further the point is away from the rotational axis of the press roller 27. A point on the upper side of the conveyor belt 1 is further away from the center point of the press roller 27 than a point on the underside of the conveyor belt 1. The speed on the upper side of the conveyor belt 1 is defined by $v_2$. On the conveyor belt 1, a sheet 3 of paper is located, which is conveyed by the conveyor belt 1. The sheet 3 is held on the conveyor belt 1 to a small extent through its own force of gravity and to a large extent through electrostatic charging of the conveyor belt 1. The surface of the sheet 3 moves at a speed $v_1$ in the direction of the arrow, whereby $v_1$ is not equal to $v_2$.

Similar to the manner described above, the speed of the sheet 3 increases with increasing distance from the center point of the press roller 27 and changes as a result of increasing thickness of the sheet 3. It is assumed that the time point of the printing of the sheet 3 by a print cylinder or intermediate cylinder 25 (see FIG. 3) above the sheet 3 is adapted to the speed $v_2$ of the surface of the press roller 27. Since the speed $v_1$ on the surface of the sheet 3 is not equal to $v_2$, the printing is not done on the surface of the sheet 3 at the proper time, but delayed by the additional distance that the surface of the sheet 3 covers beyond the distance that the surface of the conveyor belt 1 covers, because of the different speeds. This means that the larger the deviation of the two speeds $v_1$ and $v_2$ from each other is, the greater the shift of the printed image on the sheet 3.

Figure 2:
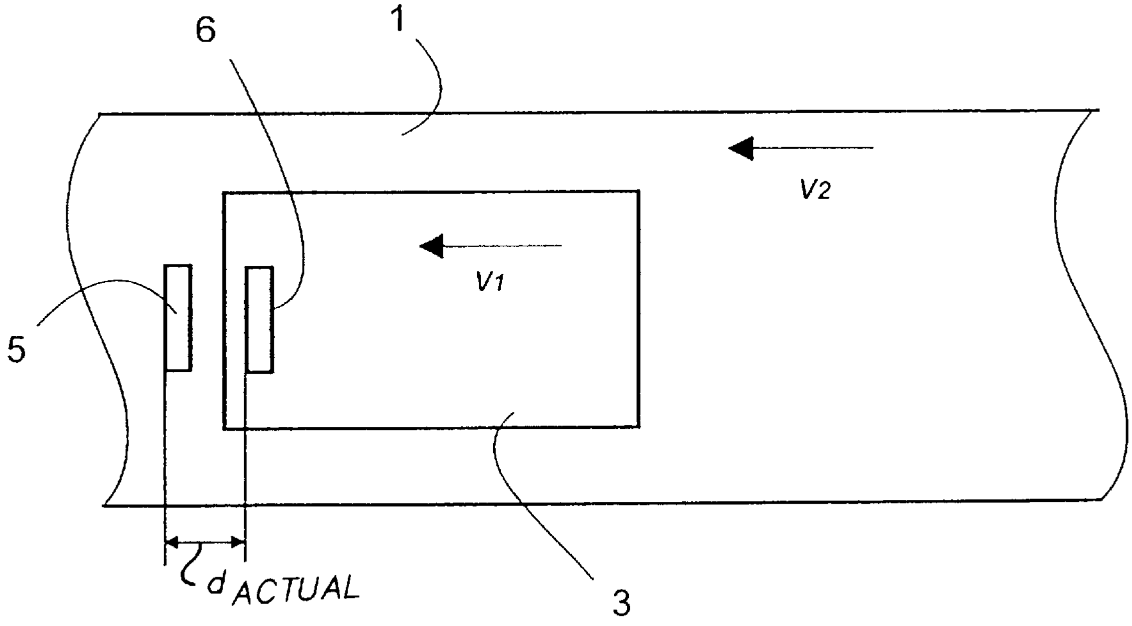
FIG. 2 shows an overhead view of a conveyor belt with a sheet having registration marks involving the invention.

FIG. 2 shows an overhead view of a section of a conveyor belt 1, which moves in the direction of the arrow at the speed $v_2$. On the conveyor belt 1, a sheet 3 is located, which is held essentially by electrostatic forces on the conveyor belt 1. With reference to FIG. 1, the sheet 3 moves at a higher speed $v_1$ than the conveyor belt 1, since the conveyor belt 1 and the sheet 3 have a curve. It is assumed there is a calibration run of the printing machine to set the registration of the color separations to each other. The term color separation is defined for this description as one of the colors to be applied by individual print modules (one shown in FIG. 3), which are combined to form the multi-colored overall image; for example, the color separations in four-color printing: cyan, magenta, key (or black) and yellow.

For this purpose, for example, in a first print module, a registration mark 5 is applied onto the conveyor belt 1, and a registration mark 6 is applied onto the sheet 3 adjacent to the registration mark 5. The first print module, for example, is the print module for the color black, so that the registration marks 5, 6 function for adjusting and setting the registration of the black color separation of a printed image on the sheet 3. Additional print modules, which are not shown here, apply respectively, other registration marks for additional color separations onto the sheet 3 and onto the conveyor belt 1.

The distance between the front edge of the registration mark 5 and the front edge of the registration mark 6 is $d_{actual}$. The distance $d_{actual}$ is determined using a second sensor 13 behind the print modules, i.e. after all registration marks have been applied on the sheet 3 and on the conveyor belt 1 for all color separations present. For this purpose, a timing counter 20 counts a specific timing number as a result of the sensor signals of the second sensor 13, whereby the specific timing number is allocated to the distance $d_{actual}$. The distance $d_{actual}$ is not equal, due to the existing effect described above, to a distance $d_{target}$ that would be determined without the sheet 3, if the registration mark 6 had been applied on the conveyor belt 1.

The distance $d_{target}$ is determined during a usual calibration run, in which the registration marks 5, 6 are applied onto the conveyor belt 1. From the difference $d_{diff}$ between the distance $d_{actual}$ of the registration marks 5, 6, which is determined for the color separation black, and the target value, the distance $d_{target}$ that is saved in memory, the registration error for the color separation of the color black is determined. The distances $d_{actual}$, $d_{target}$, and $d_{diff}$ are available as specific timing numbers, which can be converted into lengths using the speed of the conveyor belt 1. The distance measurements between the registration marks 5, 6 using the timing counter 20 lead to a sensitivity in the micrometer range. The length difference $d_{diff}$ represented in timing numbers is saved and used for the purpose of calculating a correction factor represented by a timing number.

The correction factor functions for the purpose of adapting the imaging by an imaging device 22 in such a way that the printed image is applied onto the sheet 3 in an error-free manner independently of the presence of the sheet 3 and changing thicknesses of the sheet 3. The correction factor influences signals for the imaging device 22 for the application of images onto an imaging cylinder 23, as described in detail in the following in reference to FIG. 3. In the case presented, the imaging is performed by the imaging device 22, advanced by a certain amount of time beforehand, which is dependent on the timing number of the correction factor, since the speed $v_1$ on the surface of the sheet 3 is higher than the speed $v_2$ on the surface of the conveyor belt 1 and the surface of the sheet 3 to be printed moves forward faster under the print modules.

Figure 3:
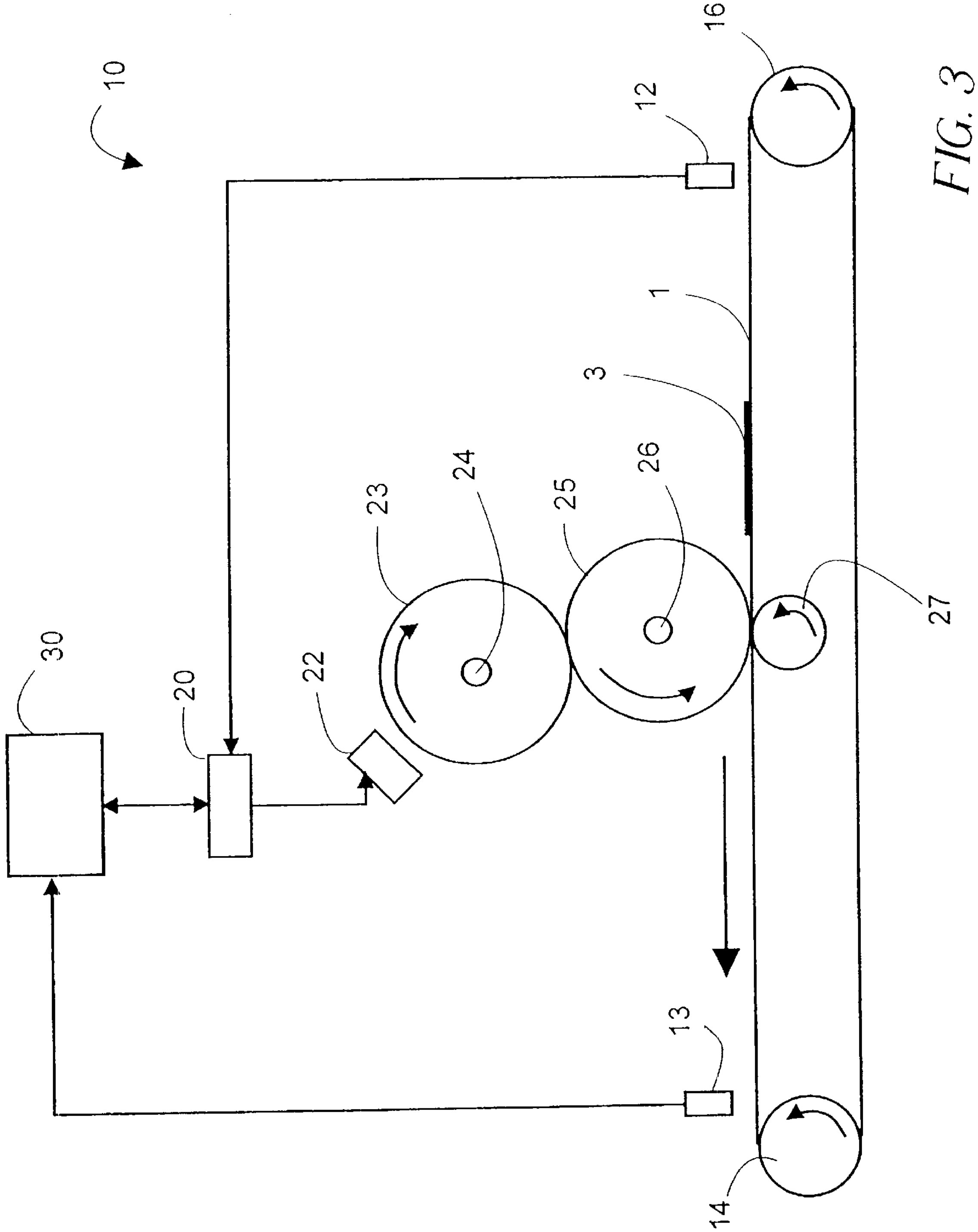
FIG. 3 shows an embodiment example of a device with a part of a print module of a printing machine involving the invention.

FIG. 3 shows a schematic block diagram of a print module above a conveyor belt 1, which conveyor belt moves in the direction of the straight arrow. The conveyor belt 1 is driven by a drive on the second deflection roller 14 and conveys sheets 3 through the printing machine. Between the second deflection roller 14 and the first deflection roller 16, additional rollers are usually arranged, which are not shown in FIG. 3. A first sensor 12 detects the front edge of the sheet 3 and transmits a signal to a timing counter 20, which is connected to a correction device 30. The timing counter 20 transmits a signal to the imaging device 22, after a certain pre-set number of cycles. In response to the signal to the imaging device 22, an image is transferred onto an imaging cylinder 23. The image is then transferred onto an intermediate cylinder 25, which rotates in the opposite direction from the imaging cylinder 23, and is printed onto the sheet 3 by the intermediate cylinder 25 when the intermediate cylinder 25 rolls onto the sheet 3.

The intermediate cylinder 25 exerts a force from above onto the conveyor belt 1, as the press roller 27 exerts an opposite force onto the conveyor belt 1 from below. The imaging cylinder 23, the intermediate cylinder 25, the first deflection roller 16 and the press roller 27 are driven by friction with the conveyor belt 1 that is driven by the drive on the second deflection roller 14. The imaging cylinder 23 and the intermediate cylinder 25 have a first encoder 24 and a second encoder 26, respectively, which determine the rotational angle of the imaging cylinder 23 and/or the intermediate cylinder 25 and in this way make possible the determination of their positions.

The imaging by the imaging device 22, triggered by the timing counter 20 as a result of the signal transmitted from the first sensor 12, is done at the exact time point at which the image is transferred from the imaging cylinder 23 via the intermediate cylinder 25 onto the sheet 3, in a manner accurate to the millimeter. The time which passes from the imaging of the imaging cylinder 23 until the application of the image onto the sheet 3 is called the delay time. The term image includes here individual image lines, image areas and images of color separations. Color separations combine to form the final overall image on the sheet 3.

The effect described in relation to FIGS. 1 and 2 and caused by the sheet 3, however, leads to errors in which the image is not applied at the desired location on the sheet 3. In order to prevent these errors, prior to the printing operation, a calibration run is planned which functionally is connected to other calibration runs, and in which a registration mark pattern similar to the one of FIG. 2 is applied by the print modules with a registration mark 5 on the conveyor belt 1 for each color separation and with a registration mark 6 on the sheet 3 for each color separation. For a four-color printing, there are thus four registration marks on the conveyor belt 1 and four corresponding registration marks on the sheet 3. The front edges of the registration marks 5, 6 are detected by a second sensor 13, which is arranged behind the print modules and transmits a signal to the timing counter 20.

The timing counter 20 counts a timing number between the detection of the front edge of the registration mark 5 and the front edge of the registration mark 6 and transfers the timing number to the correction device 30, whereby from the timing number and the known speed of the conveyor belt 1 a distance $d_{actual}$ between the front edge of the registration mark 5 and the front edge of the registration mark 6 can be calculated. In the correction device 30, in addition, a target value of the distance $d_{target}$ of the front edge of the registration mark 5 from the front edge of the registration mark 6 is saved in memory as a corresponding timing number. From the calculated actual distance $d_{actual}$ and the saved target value of the distance $d_{target}$, a difference $d_{diff}$ is formed as a correction value. The above calibration process is performed several times, whereby the correction values obtained are averaged into a final correction value. The final correction value is added in the correction device 30 into a delay value that corresponds to a delay time.

Next, in the timing counter 20, a corrected delay value is present, which corresponds to the delay value changed by the final correction value, and takes into account the influence of the registration error described above. During printing, the imaging by the imaging device 22 is performed with the timing number of the corrected delay value, starting from the sensor signal of the first sensor 12, since the timing counter 20 now counts the number of cycles, which correspond to the corrected delay value, which is combined from the original delay value and the final correction value. The corrected delay values can be saved in the correction device 30 for different types of sheets 3. Prior to a printing, the type of sheet 3 is entered into a control device of the printing machine and the printing is performed with the corrected delay value that is assigned to it. In this way, the operation for determination of the correction value and the calculation of the corrected delay value is saved, for correction of the registration error described above, for different types of sheets having different thicknesses.

The invention has been described in detail with particular reference to certain preferred embodiments thereof, but it will be understood that variations and modifications can be effected within the spirit and scope of the invention.

What is claimed is:

1. Process for determining registration errors during printing, which are caused by different speeds of a conveyor belt (1) and a sheet (3) moved on such conveyor belt, said process comprising: applying at least a first registration mark (5) onto the conveyor belt (1) and at least a second registration mark (6) onto the sheet (3), detecting the first registration mark (5) and the second registration mark (6), calculating the distance between the first registration mark (5) and the second registration mark (6) and comparing the distance to a target value to determine a registration error correction value.

2. Process according to claim 1, characterized in that the sheet (3) is detected by a first sensor (12) prior to print modules of a printing machine, which generates a start signal upon detection of the sheet (3) in order to start a timing counter (20), the registration marks (5,6) are applied by the print modules and the registration marks (5,6) are detected by a second sensor (13) after said print modules, which generates a stop signal for stopping the timing counter (20).

3. Printing machine in which sheets (3) are moved by a conveyor belt (1) through at least one print module, characterized by a device (10) for determining registration errors during printing, which are caused by a different speed between the conveyor belt (1) and a sheet (3) moved on this conveyor belt (1), said print module configured to apply at least a first registration mark (5) onto the conveyor belt (1) and at least a second registration mark (6) onto the sheet (3), said printing machine comprising a sensor (13) for detection of the first registration mark (5) and the second registration mark (6), a correction device (30) for calculation of the distance between the first registration mark (5) and the second registration mark (6), and a comparator for comparing the distance to a target value to determine a registration error correction value.

4. Printing machine according to claim 3, characterized by said correction device (30) having means for correcting the registration error that was determined thereby.

5. Printing machine according to claim 3, further comprising a timing counter (20), a first sensor (12) for generating a start signal for starting said timing counter (20) upon detection of said sheet (3), after said at least one print module applies the registration marks (5, 6), a second sensor (13) for generating a stop signal for stopping said timing counter (20), and said correction device (30) for correcting registration errors which are caused by a different speed of said conveyor belt (1) and said sheet (3) moved on said conveyor belt (1).

* * * * *